United States Patent [19]
Li et al.

[11] Patent Number: 5,986,878
[45] Date of Patent: Nov. 16, 1999

[54] ELECTROCHEMICAL CAPACITOR WITH SOLID ELECTROLYTE

[75] Inventors: Changming Li, Vernon Hills; Robert H. Reuss, Inverness, both of Ill.

[73] Assignee: Motorola, Inc., Schaumburg, Ill.

[21] Appl. No.: 08/936,789

[22] Filed: Sep. 25, 1997

[51] Int. Cl.[6] .................................................. H01G 9/00
[52] U.S. Cl. ........................ 361/523; 361/532; 29/25.03
[58] Field of Search ........................... 361/502, 503–505, 361/508, 511–512, 516, 520, 523–526, 527, 530, 532, 534, 528; 29/25.03; 429/30, 33, 42, 149, 304, 306, 307, 309, 210, 212–214, 101, 102

[56] References Cited

U.S. PATENT DOCUMENTS

| | | |
|---|---|---|
| 3,502,947 | 3/1970 | Hand . |
| 4,031,436 | 6/1977 | Alwitt ....................................... 361/301 |
| 5,382,481 | 1/1995 | Fleischer .................................. 429/192 |
| 5,512,391 | 4/1996 | Fleischer .................................. 429/213 |
| 5,518,838 | 5/1996 | Bai et al. .................................. 429/191 |
| 5,568,353 | 10/1996 | Bai et al. .................................. 361/523 |
| 5,580,681 | 12/1996 | Fleischer .................................. 429/192 |
| 5,604,660 | 2/1997 | Bai et al. .................................. 361/525 |
| 5,723,231 | 3/1998 | Wu et al. .................................. 429/203 |
| 5,751,541 | 5/1998 | Li et al. .................................... 361/525 |
| 5,847,920 | 12/1998 | Li et al. .................................... 361/525 |

*Primary Examiner*—Dean A. Reichard
*Assistant Examiner*—Anthony Dinkins
*Attorney, Agent, or Firm*—Felipe J. Farley

[57] ABSTRACT

A capacitor (100) includes first and second electrodes (102, 103) that each have an electroactive material (115, 120) disposed on a metallic substrate (105, 110). A solid electrolyte (125) including a polyacid is positioned between the first and second electrodes (102, 103). Polyacids are relatively low in cost, and their high ionic conductivity together with their thermal stability makes polyacids a viable alternative to solid polymer electrolytes.

2 Claims, 1 Drawing Sheet

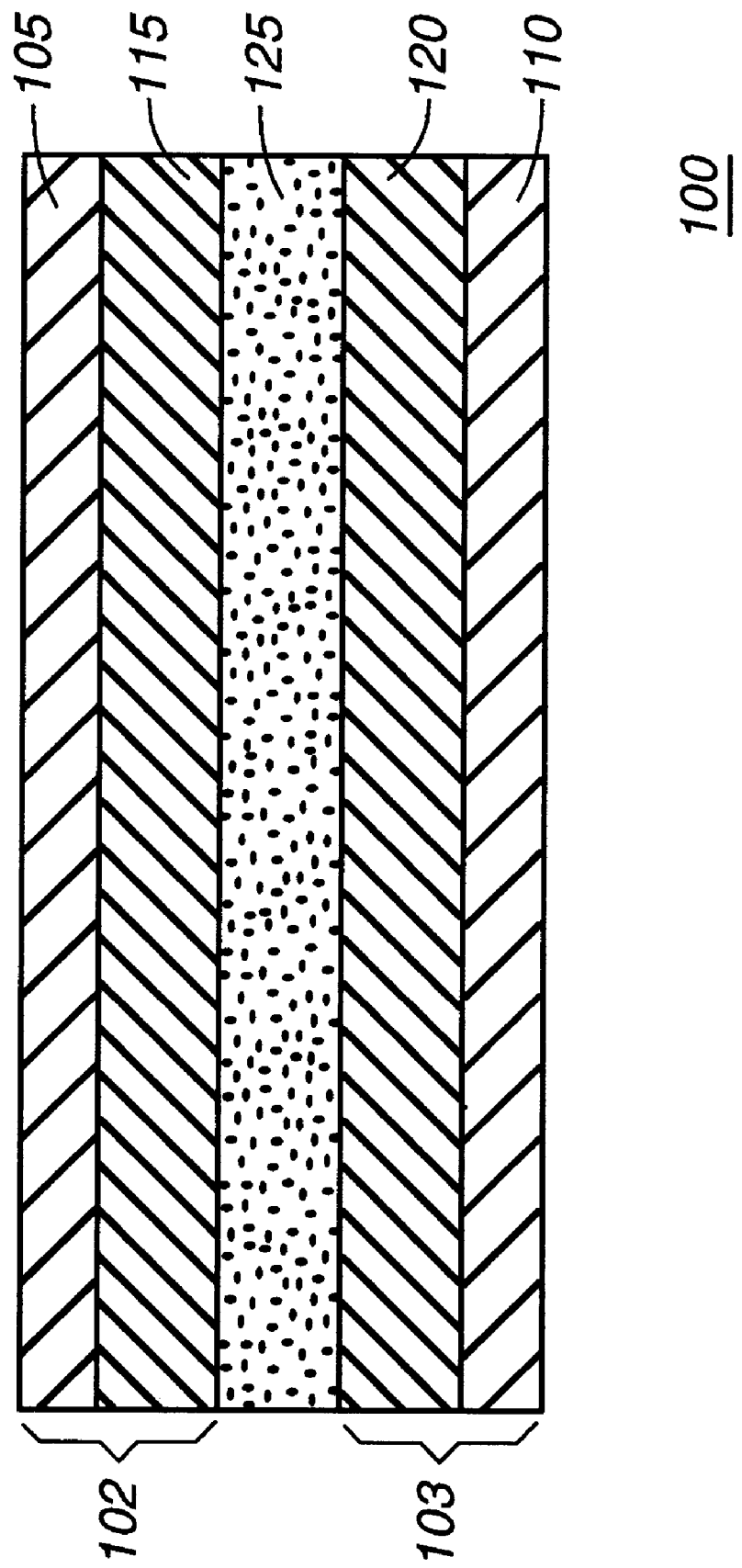

ELECTROCHEMICAL CAPACITOR WITH SOLID ELECTROLYTE

RELATED APPLICATIONS

This application is related to Ser. No. 08/987,862, filed Sep. 25, 1997, to Li et al., entitled "Electrochemical Capacitor with Polyacid Electrolyte", filed concurrently herewith.

TECHNICAL FIELD

This invention relates in general to capacitors, and more specifically to electrolytes for use in electrochemical capacitors.

BACKGROUND

Electrochemical capacitors typically include outer substrates upon which electroactive material is disposed. Both outer substrates and electroactive material disposed thereon can be formed from equivalent materials, in which case the capacitor is "symmetrical", or different materials, in which case the capacitor is "asymmetrical." Each outer substrate and its corresponding electroactive material forms an electrode, and positioned between the two electrodes is an electrolyte that is ionically conductive and electrically insulative. In a multiple cell capacitor, several electrode and electrolyte layers can be formed between the two outer electrodes to provide the functionality of a plurality of capacitors within a single package.

It is desirable for solid electrolytes to be highly ionically conductive, stable at temperatures between 100 and 200° Centigrade (C), minimally reactive, and low in cost. However, only a few known capacitor electrolytes, such as perfluorinated sulphonic membranes, e.g., Nafion by DuPont, and polybenzimidazoles (PBI), can be used at high temperatures, and these electrolytes are relatively expensive. Acid-doped solid electrolytes give good performance but are highly corrosive, requiring that current collectors used therewith be highly resistant to acid.

Thus, what is needed is an improved electrolyte for use in capacitors.

BRIEF DESCRIPTION OF THE DRAWING

FIG. 1 is a side, cutaway view of an electrochemical capacitor in accordance with the present invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a side, cutaway view of an energy storage device 100, such as a capacitor or an electrochemical cell, is shown. The energy storage device 100, hereinafter referred to as a capacitor for illustrative purposes only, includes electrodes 102, 103 between which a solid electrolyte 125 is positioned. The electrodes 102, 103 each include a current collector 105, 110 and electroactive material 115, 120. As shown, the current collectors 105, 110 can comprise metallic substrates, and the electroactive material 115, 120 can comprise metal oxide disposed on the substrates. Alternatively, one or both of the electrodes 102, 103 could be formed from polymer in which current collecting material, such as electrically conducting fibers, and electroactive material are embedded.

By way of example, the current collecting material can be formed from fibers or substrates fabricated of aluminum, copper, titanium, alloys thereof, or combinations thereof. The electroactive material is preferably $RuO_2$, although other materials can also be used. Such other materials include, among others, iridium, cobalt, platinum, tungsten, vanadium, iron, nickel, alloys thereof, mixtures thereof, their oxides, and reduction/oxidation (redox) polymers. Particular examples of capacitor electrode materials are disclosed in U.S. Pat. No. 5,518,838 to Bai et al., entitled "Electrochemical Cell Having Solid Polymer Electrolyte and Asymmetrical Inorganic Electrodes"; U.S. Pat. No. 5,510,046 to Li et al., entitled "Modified Electrolyte for Electrochemical Cells"; U.S. Pat. No. 5,563,765 to Lian et al., entitled "Amorphous Cobalt Alloy Electrodes for Aqueous Electrochemical Devices"; U.S. Pat. No. 5,429,895 to Lian et al., entitled "Nickel Alloy Electrodes for Electrochemical Devices"; and U.S. Pat. No. 5,568,353 to Bai et al., entitled "Electrochemical Capacitor and Method of Making Same", the disclosures of which are incorporated herein by reference.

In accordance with the present invention, the electrolyte 125 is formed from a polyacid, such as an isopolyacid or a heteropolyacid, both of which exhibit a relatively high degree of protonic activity. Among the various polyacids, phosphotungstic acid (PWA) and phosphomolybdic acid (PMA), in their 29-water molecule hydrate forms ($H_3PW_{12}O_{40} \cdot 29H_2O$ and $H_3PMo_{12}O_{40} \cdot 29H_2O$, respectively), are characterized by considerable protonic conductivity. More specifically, solid state, room temperature PWA has a protonic conductivity of about 0.17 Siemens/centimeter (S/cm), and PMA, also at room temperature, has a protonic conductivity of about 0.18 S/cm. These values are about twice as high as those for the prior art electrolytes of $PVA/H_3PO_4$ and $PBI/H_3PO_4$, both of which have conductivities of about $8 \times 10^{-2}$ S/cm. PWA and PMA also have relatively high thermal stabilities. For example, the loss weight of PWA on ignition at 800° C. is less than 17%.

Polyacids, such as PWA, PMA, and silicontungstic acid (PSA), are also relatively low in cost. In particular, the price of PWA is much lower than known high temperature solid electrolyte materials such as Nafion membrane and PBI film. Nafion membrane was quoted by DuPont at a price of about $800/m$^2$, and PBI film costs between $80/m$^2$ and $100/m$^2$, while PWA only costs approximately $2/m$^2$. The high ionic conductivity together with thermal stability and low cost makes polyacids a viable and desirable alternative to other solid electrolytes, such as known polymer electrolytes.

EXAMPLE I

FWA and PMA were obtained from Aldrich. Each was separately dissolved in deionized water to prepare a 60 wt % solution of PWA and a 60 wt % solution of PMA, and corrosion experiments were conducted. Both heteropolyacid solutions were applied to aluminum foil surfaces, which are typically easily attacked by acids. After water evaporation, thin heteropolyacid films formed on the aluminum foil. No corrosion was observed by visual inspection after a week had passed. Additionally, no corrosion was visible after passage of two weeks and heating to 105° C. Copper foils were tested using the same experiments described herein, and no corrosion was visible.

EXAMPLE II

60% PWA and PMA aqueous solutions were used to make electrochemical capacitors to evaluate electrolyte performance. Thermally formed $RuO_2$ on thin Ti foil substrates were used as electrode material, and eight electrodes were fabricated. To make single cell devices, two single-sided electrode surfaces were coated with the PMA solution, followed by another coating that was applied after the first coating had dried to form a thin heteropolyacid film. Similarly, two single-sided electrode surfaces were coated with the PWA solution, followed by another coating after the first coating dried to form a film. There was no pretreatment with $H_2SO_4$, as is currently needed with $PVA/H_3PO_4$ electrolytes. Electrodes were then paired to form two single-cell capacitors with PWA electrolyte and two single-cell capacitors with PMA electrolyte.

The solid electrolyte layers of each solid heteropolyacid electrolyte was less than 0.5 mils, but no shorts were observed for any of the capacitor cells. Because the mechanical strength of known solid electrolytes is relatively poor, other types of solid electrolytes typically must be on the order of about 3 mils. The polyacid electrolytes, which can be thinner than prior art solid electrolytes, therefore advantageously provide lower device equivalent series resistance (ESR).

EXAMPLE III

Four electrodes were fabricated as in Example II. Two of the electrodes were coated on both opposing surfaces with a 60% PWA aqueous solution, then another coat was applied once the initial coat had dried to form a film, thereby forming bipolar electrodes. The other two electrodes were coated with two coats of the 60% PWA solution on a single surface only. The coated electrodes were then sandwiched together to form three cells, with the single-surface coated electrodes on the exterior and the bipolar electrodes on the interior. The positioned electrodes were then laminated to form a three-cell bipolar device.

A potentiostat and an Hewlett Packard mnilliohmeter were used to conduct cyclic voltammogram experiments and conductivity measurements for the four single-cell capacitors and the one three-cell capacitor. This data is shown in the following table.

TABLE

Experimental Data for Fabricated Capacitors

| Device Number | Surface Area ($cm^2$) | Capacitance ($mF/cm^2$) | Electrolyte thickness (mils/cell) | ESR (m) | Unit ESR (m · $cm^2$) |
|---|---|---|---|---|---|
| #1 (PMA Single Cell) | 2 | 48 | 0.50 | 38 | 76 |
| #2 (PMA Single Cell) | 2 | 45 | 0.45 | 31 | 62 |
| #3 (PWA Single Cell) | 2 | 46 | 0.42 | 27 | 54 |
| #4 (PWA Single Cell) | 2 | 50 | 0.47 | 34 | 68 |
| #5 (PWA Three Cell) | 2 | 15 | 0.45 | 87 | 58 |

In summary, polyacid solid electrolytes can be used in capacitors, such as electrochemical, electrolytic, and double layer capacitors. Such electrolytes are mechanically strong and can be formed into thin electrolyte layers to conveniently reduce device ESR. Additionally, the polyacid electrolytes are useful in capacitors using metallic current collectors since the polyacid electrolytes are much less corrosive than are other electrolytes that include acid components. These advantages, in view of the thermal stability, low cost, and high protonic conductivity of polyacid electrolytes, make polyacid electrolytes a desirable alternative to prior art solid electrolytes used in capacitors.

What is claimed is:

1. An electrochemical capacitor, comprising:

first and second electrodes, each comprising current collecting material and metal oxide material; and a solid electrolyte positioned between the first and second electrodes, the solid electrolyte including a polyacid;

wherein the solid electrolyte comprises a heteropolyacid film formed by coating onto one of the first and second electrodes are greater than 60% by weight phosphotungstic acid (PWA) aqueous solution that is subsequently dried.

2. An electrochemical capacitor, comprising:

first and second electrodes, each comprising current collecting material and metal oxide material; and a solid electrolyte positioned between the first and second electrodes, the solid electrode including a polyacid;

wherein the solid electrolyte comprises a heteropolyacid film formed by coating onto one of the first and second electrodes are greater than 60% by weight phosphomolybdic acid (PMA) aqueous solution that is subsequently dried.

* * * * *